United States Patent [19]

Thompson et al.

[11] Patent Number: 4,862,394

[45] Date of Patent: Aug. 29, 1989

[54] DROP HEIGHT RECORDER

[75] Inventors: David B. Thompson, Grand Prairie; Stanley V. Preskitt, Dallas; Harvey L. Downing, Garland; Michael V. Allred, Irving, all of Tex.

[73] Assignee: Dallas Instruments Incorporated, Dallas, Tex.

[21] Appl. No.: 8,189

[22] Filed: Jan. 28, 1987

[51] Int. Cl.[4] .......................... G11B 5/00; G06F 15/74; G01N 3/30; G01P 15/08

[52] U.S. Cl. .................................. 364/551.01; 360/5; 360/6; 377/23; 73/489; 73/509; 369/53

[58] Field of Search ................... 364/550, 551.01, 200, 364/900, 556; 346/7, 33 T P; 377/23; 73/12, 489–492, 509, 516 R, 517 R; 360/5, 6; 369/53, 69

[56] References Cited

U.S. PATENT DOCUMENTS

| | | | |
|---|---|---|---|
| 3,284,708 | 11/1966 | Morris et al. | 73/503 |
| 3,599,222 | 8/1971 | Franklin et al. | 360/5 X |
| 3,643,513 | 2/1972 | Weaver | 73/517 R |
| 3,781,824 | 12/1973 | Caiati et al. | 360/5 X |
| 4,004,450 | 1/1977 | Yakshin et al. | 73/12 |
| 4,016,766 | 4/1977 | Morris | 73/517 R |
| 4,114,450 | 9/1978 | Shulman et al. | 73/489 |
| 4,222,272 | 9/1980 | Mairson | 73/517 R |
| 4,387,587 | 6/1983 | Faulconer | 73/9 |
| 4,470,116 | 9/1984 | Ratchford | 360/5 X |
| 4,533,962 | 8/1985 | Decker et al. | 360/6 X |
| 4,621,335 | 11/1986 | Bluish et al. | 360/5 X |
| 4,638,289 | 1/1987 | Zottnik | 73/517 R X |
| 4,646,241 | 2/1987 | Ratchford et al. | 360/5 X |

FOREIGN PATENT DOCUMENTS

| | | | |
|---|---|---|---|
| 0074413 | 6/1980 | Japan | 73/489 |
| 0054958 | 2/1911 | Switzerland | 73/489 |
| 0987530 | 1/1983 | U.S.S.R. | 73/492 |

Primary Examiner—Parshotam S. Lall
Assistant Examiner—Joseph L. Dixon

[57] ABSTRACT

A drop height recorder apparatus includes a housing suitable for packaging for shipment from an origin point to a destination point, a triaxial accelerometer provides three signals to corresponding high gain and low gain channels. The three high gain channel signals are full wave rectified to change any negative signals to positive signals for summing into a single high gain "zero G" (free-fall) channel. AN analog to digital converter is connected to the three low gain channels, the single high gain channel, and to auxiliary sensors for digitizing the analog signals. A recorder has a programmable controller connected to the ADC for setting the digital sampling rate. The digitized low gain channel signals are passed through a digital trigger threshold comparator for comparison with a reference signal for generating event detecting trigger signals on the way to a delay memory which also receives the digitized high gain zero G signal and auxiliary signals. In response to a trigger signal the programmable controller reads out of the delay memory preselected numbers of pre-trigger and post-trigger data as an event sample either for a data processing memory for processing the signals for desired information and storage in a storage memory or for a storage memory. A pre-selected number of event waveform signals together with time, date, and auxiliary data signals are stored in the storage memory. After recovery of the instrument, a personal computer can be attached for reading out the stored event waveforms from which the time of free-fall occurring during each event is determined and the drop height in inches computed. The personal computer is used prior to shipment to set the program parameters and operation modes in the programmable controller.

19 Claims, 2 Drawing Sheets

DROP HEIGHT RECORDER

BACKGROUND OF THE INVENTION

This invention relates to recording apparatus and more particularly to a drop height recorder which is adapted for shipment via a transportation system for recording such handling and environmental conditions as drop heights, drop impacts, shock events, temperature, relative humidity and the like.

An electronic recording accelerometer is known that is adapted to simulate a parcel which is sent through a parcel handling system such as the U.S. Postal System for recording shock, temperature, and relative humidity for a period of up to two weeks with the data being stored in semiconductor memories in two formats. One format is a statistical compilation of all valid events that occurred and the other is a time history of valid events that occurred. The exact magnitude of the event is not stored, but rather the event is classified into a number of predetermined amplitude levels or windows. For shock data, these windows are five G's wide from the base level of five G's to 80 G's and ten G's wide from eighty G's to 120 G's. The temperature windows are ten degrees F wide from −20 degrees F to +140 degrees F, and for relative humidity, the windows are ten percent wide from twenty percent to one hundred percent.

The known system uses three accelerometers for sensing acceleration along three mutually perpendicular axes; the accelerometers are connected to operational amplifiers and filters. The amplifiers raise the signal level sufficiently to be fed to the filters. The filters remove high frequency components of any shock wave sensed, as the low frequency components of the shock wave are of primary concern.

The three mutually perpendicular axes, temperature, and relative humidity analog signals are fed to encoding circuits which provide binary multi-bit data words of the levels sensed. The binary digital data words are applied to a statistical memory as well as respective time tagged memories for acceleration, temperature, and relative humidity. The statistical memory provides a count of the various levels of acceleration, temperature and relative humidity sensing while the time tagged memories provide stored time dependent data of the maximum values sensed during selectable time periods within the time allotted to send the apparatus from one destination to another. Those persons skilled in the art desiring more information for the known apparatus are referred to U.S. Pat. No. 4,114,450 issued Sept. 19, 1979.

The essential difference between the known apparatus and the present invention is that the present invention stores amplified signals of a triaxial accelerometer during free-fall (also referred to hereinafter as "zero G" signals) as pre-trigger event data, plus the full waveform of post-trigger acceleration signals in a solid state memory. The drop heights are determined from the data recorded prior to drop impact, from which the time spent in free-fall (zero G) can be ascertained and used to calculate the drop heights. The post-trigger, full waveform acceleration signals enable the packaging engineer to duplicate the impact accelerations in the laboratory on shock testing apparatus for testing improved packaging designs.

SUMMARY OF THE INVENTION

Accordingly, it is an object of the invention to provide a drop height recording apparatus for acquiring data about the small or large package transportation/handling environment.

Yet another object of the invention is to determine free-fall drop heights experienced by packaged equipment during a shipment over an extended period of time.

Another object of the invention is to provide a recording apparatus for acquiring shock data necessary for the development of cost effective shipping containers.

Still another object of the invention is to provide a drop height recording apparatus for acquiring specific data required by a particular shipping application, such as determining the orientation of the package at the time of impact through interpretation of signed acceleration impact signals.

A further object of the invention is to provide a drop height recording apparatus whose initial set up and the recovery of event information recorded can be accomplished by a separate personal computer.

Still a further object of the invention is to provide a drop height recording apparatus which records time and data information together with data samples for each event recorded.

Still a further object of the invention is to provide a drop height recording apparatus which includes an intermediate data processing memory wherein the acquired event data may be evaluated, analyzed, compressed and/or discarded prior to being placed in a primary memory storage.

Still a further object of the invention is to provide a drop height recording apparatus which records temperature and humidity information together with data samples for each event recorded.

Still a further object of the invention is to provide a drop height recording apparatus which records only when a triggering event occurs.

Still a further object of the invention is to provide a drop height recording apparatus which records waveform data digitally in a solid state memory and whose pre- and post-trigger data sampling rate and the number of samples taken can be varied.

Briefly stated the drop height recorder invention is a small, lightweight, battery powered, portable, solid state, programmable, microprocessor controlled, triggered, digital recorder having a triaxial accelerometer sensor input and selected auxiliary sensor inputs. When triggered by an impact event, the recorder stores preselected numbers of samples of four digitized waveforms generated prior to and after impact, together with the time and date of the event and the auxiliary data.

The triaxial accelerometer has high and low gain amplifiers for each of the three accelerometers. The high gain amplifiers are used to sense conditions during free-fall. The high gain amplifier signals are summed to conserve memory space and to provide a single zero G signal, the time-history of which is subsequently used for determining the time of free-fall and processed to determine drop heights from 3 inches to 60 feet. The three low gain amplifier channels provide acceleration data on impact which is used for determining the effectiveness of the packaging materials in which the drop height recorder is enclosed and enables laboratory duplication of the impacts or shocks received. The single high gain zero G signal and the three low gain acceleration signals are continuously sampled and digitized, and the digitized data is processed through a digital delay.

BRIEF DESCRIPTION OF THE DRAWINGS

Other objects and features of the invention will become more readily apparent from the following detailed description when read in conjunction with the accompanying drawings in which.

DETAILED DESCRIPTION OF A PREFERRED EMBODIMENT

Figure 1:
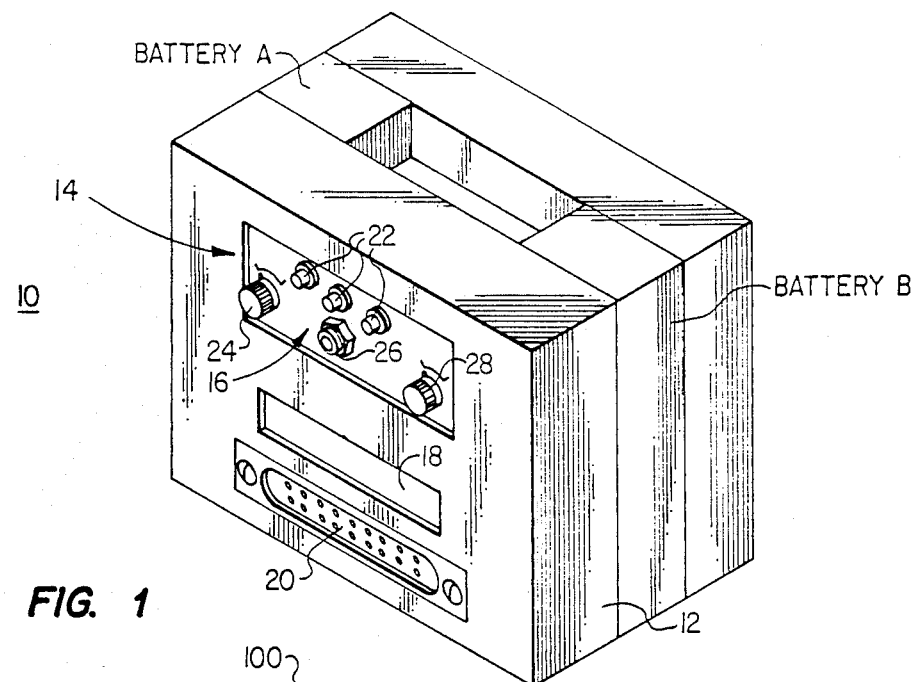
FIG. 1 is an isometric view of the unpackaged drop height recorder.

The drop height recorder 10 (FIG. 1) includes a housing 12 having a front panel surface 14. The housing 12 may be, for example, made of a tough shock resistant plastic material. The panel surface 14 includes an operation control panel 16, a display 18 and an RS 232 C communications port 20. The operation control panel 16 includes three light emitting diode (LED) indicators 22, one to indicate connection status for a battery charger and one each to show the charging status of each of the batteries indicated at A and B, a power ON/OFF switch 24, a battery charger jack 26, and a RUN/STOP switch 28. Four soldered in fuses are included, one for each battery pack (2), one for the battery charger, and one for the electronics.

The LCD display 18 displays instrument parameters and configuration during field use including the recorder's internal time and date, the unit ID number, the last event number, the maximum number of events which can be recorded, the wrap number, the internal temperature, the recording mode, the battery voltage, and the RS-232 port status. The RS 232 C port is for connecting a suitable personal computer such as, for example, an IBM XT or AT sold by International Business Machine Co. for programming and configuring the drop height recorder and data retrieval and analysis.

Figure 2:
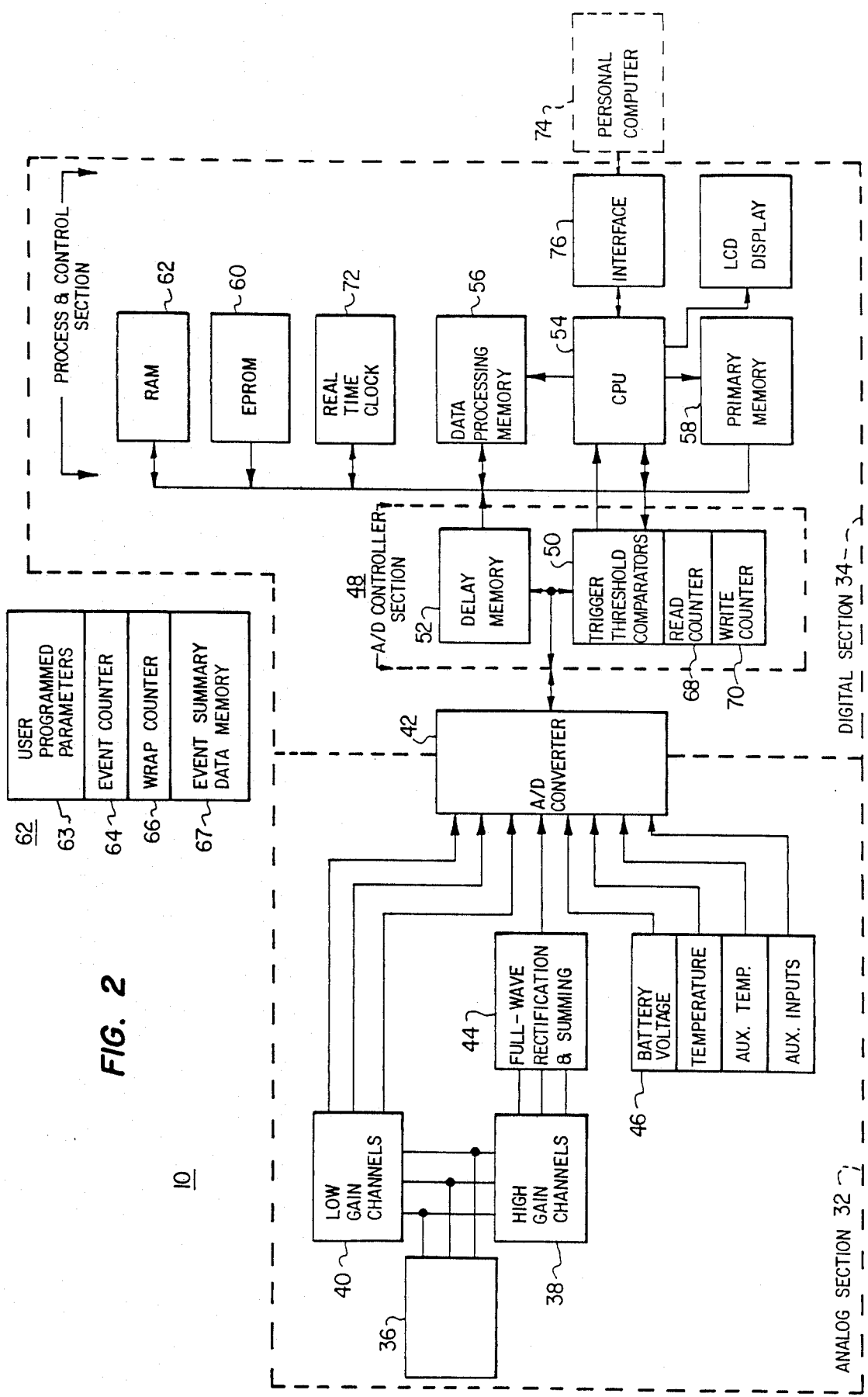
FIG. 2 is a schematic view in block form of the drop height recorder circuitry.

The drop height recorder is a small, lightweight, solid state, microprocessor controlled digital recorder 10 (FIG. 2) which includes an analog section 32 and a digital section 34.

The analog section 32 includes a triaxial accelerometer 36 having three output signals connected to corresponding high gain channels 38 and low gain channels 40. For purposes of description only and not by way of limitation, the description will refer to the triaxial accelerometer as the free-fall sensor although it will be readily understood by those skilled in the art that velocity or gravity sensing displacement sensors could be used as sensors for free-fall condition measurements. The triaxial accelerometer 36 is a triaxial type with built in preamplifiers. The low gain analog channels have a full scale (±100%) output equal to about 150 G's, and the high gain analog channels have a full scale output equal to about 2 G's.

The triaxial accelerometer measures ambient accelerations continuously (normal correlation) and sends the conditioned signals to two three-channel amplifiers; the first is a low gain system 40 and the second a high gain system 38. The low gain system enables the sensing and recording of high acceleration signals. The high gain system enables the recording of free-fall conditions (zero G signals).

The three low gain channel amplifiers have a frequency response from 2 Hz to 1.0 KHz, for example, with outputs connected to the first three channels of analog to digital converter (ADC) 42 of the digital section 34.

The three high gain channel amplifiers have the same frequency response with outputs to a full wave rectifier and summing circuit 44. The full wave rectifier converts all negative G indicating signals to positive G indicating signals for summing with any positive G indicating signals. The single summed signal is output to the fourth channel of the ADC 42.

Other inputs to the ADC 42 are the auxiliary sensor circuits 46. The auxiliary circuits include, for example, sensor circuits for: the battery voltage, temperature (internal and/or external), and relative humidity.

After digitization, data from the three low gain signals and the summed signal of the three high gain channel amplifiers (zero G signal) are continuously written to the recirculating delay memory 52 under the control of ADC controller 48. ADC controller 48 includes a digital trigger threshold comparator 50, a write counter 70, a read counter 68, and a recirculating delay memory 52. The trigger threshold comparator 50 compares each of the three low gain channel amplifier digital outputs to a pre-selected trigger level setting (1 to 120% full scale in 1% steps) and outputs a signal to the CPU that such an event has occurred. The write counter 70 in the ADC controller 48 keeps track of the address in the recirculating delay memory 52 that the current data is being written to. The number of pre-trigger samples to be acquired is programmed into the CPU and set by the CPU into the read counter 68. The read counter keeps track of the address in the recirculating delay memory 52 that the first pre-trigger data is to be read from when a triggering event occurs. The comparator 50 signals the CPU when a trigger has occurred, the CPU determines the address currently in the read counter 68 and prepares to start reading data from the recirculating delay memory 52 beginning at that address and writing the data into data processing memory 56 or primary memory 58 and continues to read and write data from delay memory 52 to the designated memory until the programmed number of pre- and post-trigger data samples have been written. When all required post-trigger samples have been digitized by the ADC converter 42, the CPU directs the converter to take a single sample from each of the auxiliary input channels for transmission to the recirculating delay memory, then turns off the ADC converter until the event data has been processed and/or stored in primary memory.

Time and date information from the real time clock 72 are appended to the signal and auxiliary data by the CPU when the data is written from the recirculating delay memory. Each time waveform event data is stored in the primary memory, event counter 64 is advanced one count. In certain modes of operation, which will be revealed in detail later, data may be stored in event summary data memory 67 and a wrap counter 66 may be advanced when event data is stored in the primary memory.

At the end of the recording trip or at any desired time the data in the primary memory 58 and/or in the summary data memory 67 may be transferred into a personal computer memory through the RS 232C interface 76 for processing by the personal computer.

The CPU 54 may be programmed by the external personal computer 74 to cause direct recording of the signal data from the delay memory 52 to the primary memory 58. Direct recording requires the least amount of time between successive events for the acquiring and storing of the event data. The CPU may be programmed by the external personal computer to provide two operating modes when direct recording is utilized, the FULL/STOP mode and the WRAP mode.

In the direct recording FULL/STOP mode event, data is stored sequentially in the primary memory until it is full; then the system is inhibited from accepting any more data for storage until the primary storage memory has been cleared. The event counter is advanced each time event data is stored in the primary memory.

In the direct recording WRAP mode of operation, once the primary memory has been filled with event data, the next event causes the event counter 64 to be reset to one, the wrap counter to be advanced by one, and the oldest event data in the primary memory to be replaced with the newest event data. Each time the primary memory has been completely filled or replaced the wrap counter is advanced by one count enabling the combination of the wrap counter reading and the event counter reading to determine the total number of triggering events occurring since the beginning of the recording period while in the WRAP mode.

The CPU 54 may be programmed by the external personal computer 74 to cause indirect recording of the signal data from the delay memory 52 by sending the signal data first to the data processing memory 56 for processing prior to transferring the data to the primary memory 58. Indirect recording requires more time between successive events for the acquiring and storing of the event data but allows the CPU when so programmed to compress the data by deletion of designated samples thereby enabling more event occurrences to be stored in the primary storage memory. Indirect recording also permits the CPU when so programmed to ascertain the maximum or peak values of each of the data signals while the data signals are in the data processing memory and to store these signed (+ or −) peak acceleration values along with the time, date, temperature, event number, battery voltage level and other auxiliary data as summary data in the non-volatile event summary data memory 67 before directing the processed signal data in the data processing memory to the primary memory.

The CPU may be programmed by an external personal computer to provide three operating modes when indirect recording is utilized: the FULL/STOP mode, the WRAP mode, and the PEAK mode. The FULL/STOP and WRAP modes for indirect recording operate in the same manner in which they operate with the direct recording operation described previously with reference to storage of data in the primary memory. In the preferred embodiment, summed data is stored in the event summary data memory in a corresponding FULL/STOP or WRAP sequence, but summary data could be programmed for storage in an alternative sequence to that of the primary memory as the two memories are independent in operation.

In the PEAK mode of operation the signal data is processed in the data processing memory 56 and the processed waveform data signals are stored sequentially in the primary memory 58 until it is full. While the summary data, including the signed (+ or −) peak data values for each of the three acceleration traces, date time, event number, battery voltage, temperature and the associated waveform's data location in the primary storage memory are stored sequentially in the event summary data memory 67.

Once the primary memory 58 is filled, the maximum peak value of new acceleration data is compared to the maximum peak values of each event stored in the event summary data memory 67. If the new data maximum peak value exceeds the maximum peak data value of any one or more events in the event summary data memory, the new waveform data and its summary data replace that prior event data having the lowest maximum peak value in both the primary storage memory and the event summary data memory. This process of reviewing the event summaries for the replacement by any new event exceeding the value of any previously recorded event is called "Peak Picking" and results in the highest level events being acquired during any recording session.

The CPU 54 includes as peripherals an electrically programmable read only memory (EPROM) 60, RAM 62, event counter 64, wrap counter 66 and read and write counters 68 and 70 located in the A/D controller section 48, and real time clock 72. A logic clock is included in the CPU 54 for clocking the operation of the components of the system. The PROM 60 is for example, an 8K EPROM and has the system operating program burned therein, while the RAM 62 is an 8K battery backed RAM in which is stored the user programmed data and operating configuration together with the peak data. The event and wrap counters 64 and 66 are part of RAM 62, and retain their data until a new configuration is installed, cleared by a computer, or they are cleared during a "cold start". Thus, the event and wrap counters keep track of the number of events that have occurred since a cold start was initiated.

The real time clock 72 for the system is, for example, an RCA CDP/1879, which is programmable to provide the time and date information for the events.

A personal computer (IBM compatible) 74 is connectable through an RS 232C interface 76 to the CPU 54 for reading data from the recorder and writing instructions and operating parameters into the recorder.

The programmable parameters in RAM 62 include operation configuration, user data, and channel calibration data stored in user programmed parameters 63. The computer downloaded operating configuration includes the following: date and time; trigger level, which may be set for 1 to 120% of full scale in 1% steps; data sample rate, which may be 1, 2, 2.5, 5, or 10 KHz (separately settable for pre- and post-trigger samples); number of pre- and post-trigger samples per event; memory modes, which are FULL/STOP, WRAP or MAX. with peak summary data options; and LCD display time.

User data is also downloaded from the personal computer 74 along with the operating configuration, and includes the following non-operating data: a message header, which can be up to 42 alpha/numeric (A/N) characters; trip identifiers, which are ZIP to ZIP codes; unit ID No., which can be up to 10 characters; and shipper ID, which can be up to 10 characters.

Calibration data for the three accelerometer channels, in a format of 1.0 Volt equals plus or minus 100 counts and zero offset data, is downloaded to the recorder by separate programs, and this data is uploaded with all data upload programs used by the personal computer. This data is used for normalizing the three accelerometer analog inputs in computation of peak levels calculated and stored in the event summary data memory 67 during operation, and in subsequent analysis of uploaded data by the personal computer.

Interface 74 is connected to the CPU 54 for interconnecting the CPU to a personal computer for programming the operating parameters, downloading the calibration data and recovering the acquired data.

Programming the Operating Parameters

The drop height recorder operating parameters are established and/or changed through the use of a personal computer program having menus which include the following selections:

1. Set instrument configuration. This selection displays for review and modification the instrument configuration as follows:
   a. Message header. When selected enter any desired message of up to 42 alpha numeric (A/N) characters.
   b. Trip ID. When selected enter any trip identification of up to 8 alpha numeric (A/N) characters.
   c. Unit ID. When selected enter any unit identification of up to 8 alpha numeric (A/N) characters.
   d. From ZIP. When selected enter the required data, up to 10 alpha numeric (A/N) characters.
   e. To ZIP. When selected enter the required data, up to 10 alpha numeric (A/N) characters.
   f. Trigger level. When selected enter the desired trigger level in 1% steps from 1 to 120%.
   g. Pre-trigger samples. When selected enter the number (from 1 to 2047) of samples per channel that are to be stored with each event as pre-trigger data.
   h. Post-trigger samples. When selected, enter the number (2-6140) of samples per channel that are to be stored with each event as post-trigger data.
   i. Period between pre-trigger samples. When selected enter the required period of time between pre-trigger samples as the number of 100 microsecond increments.
   j. Period between post-trigger samples. When selected enter the required time period between post-trigger samples as the number of 100 microsecond increments.
   k. LCD display seconds. When selected enter the number of seconds (1 to 9) for data display time while preparing for automatic operation.
   l. Memory mode (1) single, (2) wrap, max. (3). The single mode is selected to stop the recording of data after filling memory, or wrap mode is selected to overwrite the oldest data with the newest data after filling the memory, or max mode is selected to write data in the "peak picking" form of data acquisition.
   m. Pre-trigger samples to skip (0-10). When selected the number of samples of pre-trigger data to discard after using one is entered.
   n. Pre-trigger samples to compress. When selected the percentage of pre-trigger samples to which the skipping above is to be applied is entered; and
   o. Maximum number of events. The calculated number of total events that can be obtained using the above selections, the number of samples per channel after compression, and the total number of bytes per event (including 8 bytes of data for auxiliary channel inputs, data and time) are displayed automatically as other related data is changed.

2. Write data to disk. This selection will write all current changes in configuration data to the personal computer disk, thus saving those changes.

3. Download configuration to instrument. This selection instructs the personal computer to send the configuration, and computer time and date to the recorder.

4. Download current time/date to instrument. This selection sends time/date signals to the recorder for synchronizing the recorder's real time clock.

5. Upload configuration from instrument. This selection sends instructions to the recorder to upload its configuration to the computer. This instruction is normally used after opening a new filename for storage. It also can be used to verify entry of the configuration data into the recorder.

6. Set transducer sensitivity menu. This selection provides a SET TRANSDUCER SENSITIVITY MENU which allows the entry of individual accelerometer sensitivities in millivolts per G, changing the instrument's basic full scale range in volts to agree with actual calibration data, changing the primary memory size in blocks of 32K bytes, and downloading the data to the recorder. This menu is normally used only by a calibration or repair technician.

Data Retrieval

In order to recover the event data the recorder batteries must be charged sufficiently to run the recorder during the uploading period. An upload program is used in the personal computer for data uploading. For data retrieval, the recorder RUN/STOP switch is placed in the Stop position and the personal computer is connected to the interface communication port 76 of the recorder. Next, the RUN/STOP switch is placed in the RUN position. The display will indicate "RS-232 COMMUNICATIONS" on the display.

The computer operator has a choice of the type of data desired to be uploaded from the recorder through the following menu selections:

1. Upload data from instrument to: [filename]. This selection causes the uploading of the waveform data and auxiliary data from the recorder's primary memory, and the instruments current configuration, event and wrap counter data, and time and date into the file specified in the filename.

2. Upload peaks from instrument to: [filename]. This selection causes the uploading of the summary data stored in the recorder's event summary data memory into the file specified in the filename.

Data Processing Programs

Programs for the personal computer provide for analysis of the uploaded data and uses the filename that was assigned when the data was uploaded. The programs include the following menu selections:

1. Display instrument configuration. This selection causes the uploaded configuration to be displayed.

2. Select and view record waveform. This selection enables the computer operator to view and analyze event waveform data from the specified data file. From the time-based graphic waveform displays, cursors may be automatically or manually positioned at the points on the zero G waveform which are indicative of the initiation of a free-fall condition and at the point of impact and the time of free-fall determined within 0.011 seconds. The drop height in inches may be computed from the time of free-fall in seconds squared multiplied by the constant 193.2. Derivation of the algorithm is from the formula:

$$s = \tfrac{1}{2} at^2$$

where,
s = free-fall distance in inches
a = earth's gravitational constant in inches/sec.
t = time of free-fall in seconds.

3. Print a file. This selection enables the printing of the file containing the event summary data for a quick review of the data collected. The event summary data file in the computer is in ASCII format and may also be accessed by word processor programs such as PC-WRITE and data handling programs such as LOTUS 1-2-3.

Flowcharts

After downloading the operating procedures into the instrument, operation is explained using the flowchart for either triggered event recording mode or the time mode for triggered events.

Figure 3:
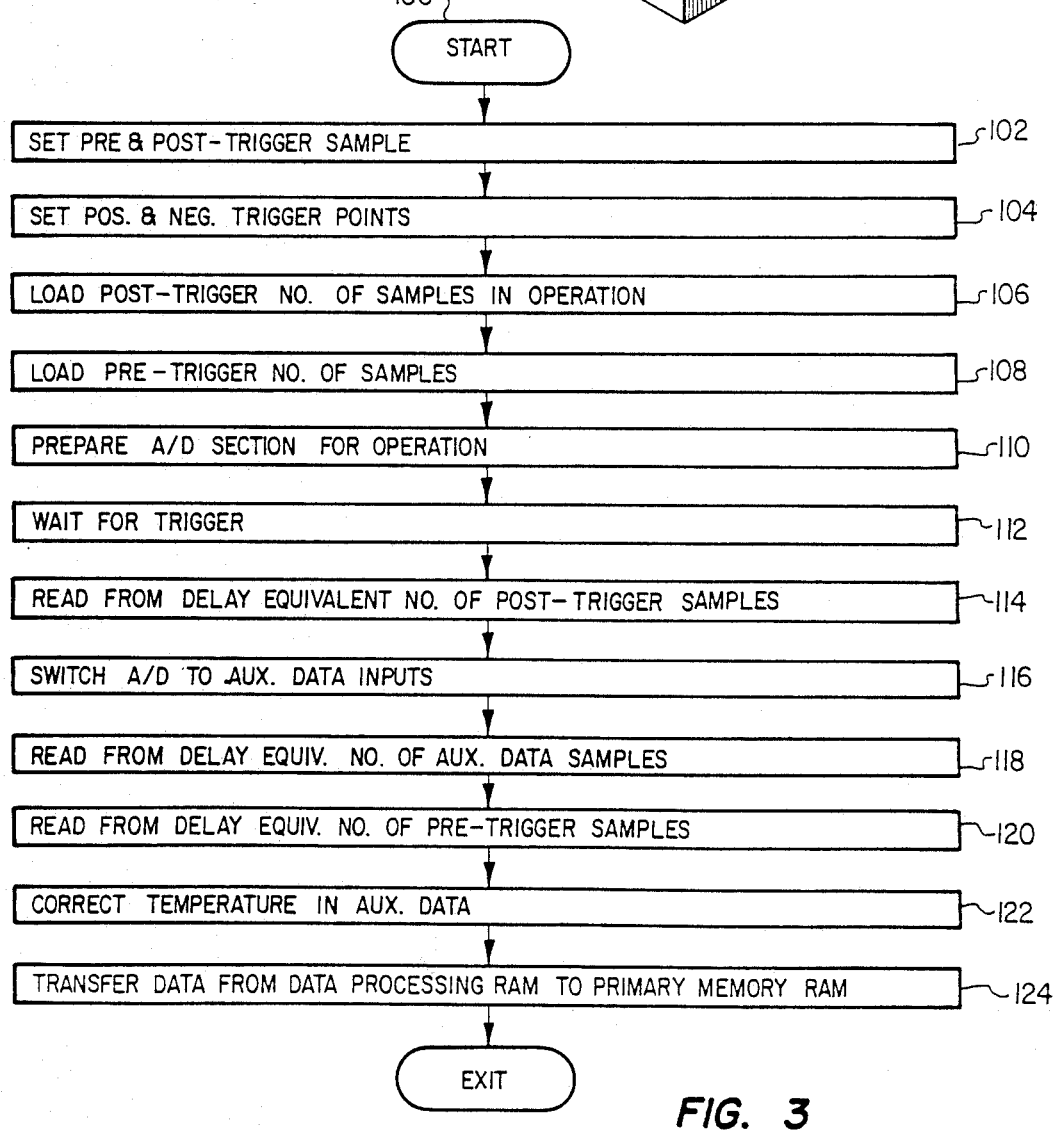
FIG. 3 is a flowchart for the triggered operation.

For triggered event recording, from the start 100 (FIG. 3) instructions 102, 106, 108, 110 and 112 are issued, respectively, to set the pre-trigger and post-trigger sample rates (step 102), to set the positive and negative trigger points (step 104), to load the total number of and post-trigger samples to be taken (step 106), to load the number of pre-trigger samples to be taken (step 108), to prepare the A/D converter for operation (step 110), and to wait for a trigger indicating an event to be sampled (step 112). The CPU monitors the A/D controller for the receipt of a trigger signal while the digitized data is being put into the circulating delay memory.

Upon receipt of a trigger signal, the CPU issues instructions 114, 116, 118, and 120, respectively, to the A/D controller to write into the data processing memory from the delay memory a number of samples equal to the number of post-trigger data samples required, starting the reading at the position of the pointer set in the delay by read counter 68 (step 114), to switch the ADC to the auxiliary data inputs (step 116), to write into the data processing memory the number of auxiliary data samples required (step 118) and to write into the data processing memory the number of pre-trigger data samples required (step 120).

The CPU then issues instructions 122 and 124, respectively, to process the data in the data processing memory including the correction of the temperature of the auxiliary data (step 122), and then transfers the data to the primary storage memory (step 124) and exits to await the next triggering event.

although only a single embodiment of the invention has been disclosed and shown, it will be appreciated by those persons skilled in the art that modifications thereto can be made without departing from the scope of the invention.

What is claimed is:

1. A drop height recorder apparatus comprising:
   (a) a housing suitable for packaging for shipment via a transportation source from an origin point to a destination point; and
   (b) a signal generating means including: a housing free-fall detecting means mounted in said housing, said housing free-fall detecting means including a sensor means; low gain means connected to the sensor means for generating signals indicative of impact forces, means connected to the low gain means for generating trigger signals when impact forces exceed a preselected threshold, a high gain means connected to the sensor means for producing free-fall signals; and a controller means connected to the signal generating means, said controller including means responsive to receipt of a trigger signal preselected signals indicative of free-fall from which the time of free-fall is determined for computing drop height.

2. A drop height recorder apparatus comprising:
   (a) a housing suitable for packaging for shipment via a transportation source from an origin point to a destination point;
   (b) a sensor means mounted in the housing and including: a sensor for generating data signals representative of gravitational forces including free-fall, and impact forces; first and second means connected to the sensor for preprocessing, respectively, the gravitational and impact force representative signals, and third means connected to the first and second means for generating digitized data sample signals representative of the impact and gravitational force representative signals; and an event determining means connected to the third means for receiving the digitized impact force signals and producing event triggering signals; and
   (c) a recorder means mounted in the housing and connected to the sensor means, the recorder means including: a data delay means connected to the third means for storing preselected quantities of the digitized data signals; and a data storage means connected to the data delay means for storing a preselected portion of the digitized signals as event data signals; and a programmable controller connected to: the event determining means, data delay means, and data storage means; the programmable controller being programmed responsive to the trigger signals to transfer from the data delay means to the data storage means preselected portions of pre-trigger and post-trigger digitized data sample signals as event waveforms to the data storage means, for subsequent processing to determine from the event waveforms free-fall events and their free-fall times from which the free-fall drop heights can be computed.

3. A drop height recorder apparatus according to claim 2 wherein the sensor of the sensor means includes a plurality of orthogonally disposed accelerometers for producing analog acceleration signals indicative of the free-fall and impact forces on the housing, and the third means is an analog to digital converter for digitizing the analog signals.

4. A drop height recorder apparatus according to claim 2 wherein the sensor of the sensor means includes a triaxial velocity sensor for producing analog signals indicative of the free-fall and impact forces on the housing, and the third means is an analog to digital converter for digitizing the analog signals.

5. A drop height recorder apparatus according to claim 2 wherein the sensor of the sensor means includes a triaxial displacement sensor for producing analog signals indicative of the free-fall and impact forces on the housing, and the third means is an analog to digital converter for digitizing the analog signals.

6. A drop height recorder apparatus according to claim 2 wherein the sensor of the sensor means includes a triaxial accelerometer means for producing analog acceleration signals for a plurality of channels; the first means includes a corresponding plurality of high gain channels connected to the accelerometer means for high gain amplification of the low acceleration signals, a full wave rectifier and a summing means connected to the plurality of high gain channels for converting any negative acceleration signals to positive signals and for summing the plurality of positive signals into a composite positive signal to compress the signals for a single channel output representative of the free-fall or zero-G state sensed; the second means includes a corresponding plurality of low gain channels for low gain amplification of high acceleration impact signals; and the third means includes an analog to digital converter (ADC) connected to the signal high gain channel and low gain channels for digitizing the signals thereof.

7. A drop height recorder apparatus according to claim 2 wherein the programmable controller is connected to the data delay means and programmed to set a pre-trigger signal sampling rate of the delay means and to set a post-trigger sampling rate of the delay means for each event.

8. A drop height recorder apparatus according to claim 2 wherein the programmable controller is connected to the data delay means and data storage means and programmed to selectively control the operation thereof in a FULL/STOP mode whereby the programmable controller after the maximum number of events have been stored stops the transfer of digitized signals from the data delay means to the data storage means.

9. A drop height recorder apparatus according to claim 2 wherein the programmable controller is connected to the data delay means and data storage means and programmed to control the operation thereof in a WRAP AROUND mode whereby the programmable controller resets the event number to zero when the event data storage memory is full and the oldest event data in the data storage memory is overwritten by the newest event data.

10. A drop height recorder apparatus according to claim 2 further including a data processing memory means connected to and between the data delay means and the data storage means, and wherein the programmable controller means is connected to the data processing memory means and programmed to process data for information in addition to event data for storage in the data storage means.

11. A drop height recorder apparatus according to claim 2 wherein the sensor of the sensor means includes a triaxial accelerometer means for producing analog acceleration signals for a plurality of channels, the first means includes a corresponding plurality of high gain channels connected to the accelerometer means for high gain amplification of the low acceleration signals, a full wave rectifier and summing means connected to the plurality of high gain channels for converting any negative acceleration signals to positive signals and for summing the plurality of positive signals into a composite positive signal for a compressed single channel output representative of the free-fall accelerations sensed, the second means includes a corresponding plurality of low gain channels for low gain amplification of high acceleration impact signals, a plurality of auxiliary sensors for producing analog auxiliary signals; and the third means includes an analog to digital converter (ADC) means operatively connected to the plurality of low gain channels, the single high gain channel, and auxiliary sensors for digitizing the analog output signals thereof and wherein the programmable controller further includes a means for producing time and data information, and the programmable controller is connected to the data delay means and programmed to input the digitized signals into the data delay means and selectively transfer the digitized signals from the data delay means into the data storage means together with time and date information.

12. A drop height recorder apparatus according to claim 6 wherein the recorder means includes a display device for displaying operating parameters including the recorder's time and date.

13. A drop height recorder apparatus according to claim 7 wherein the recorder means includes a display device for displaying operating parameters including the recorder's time and date.

14. A drop height recorder apparatus according to claim 10 wherein the programmable controller means is connected to the data processing memory means and programmed to include a selected signal use to discard ratio for selecting digitized sample signals for storage in the data storage means pursuant to the selected signal use to discard ratio.

15. A drop height recorder apparatus according to claim 10 wherein the programmable controller is connected to the data processing memory means and the data storage means and programmed to control the operation thereof in a FULL/STOP mode whereby the programmable controller when full of events stops the transfer of digitized signals from the data delay means to the data storage means.

16. A drop height recorder apparatus according to claim 10 wherein the programmable controller is connected to the data processing memory means and data storage means and programmed to control the operation thereof in a WRAP AROUND mode whereby the programmable controller resets the event number to zero when the data storage memory is full and the oldest event data in the data storage memory is overwritten by the newest event data.

17. A drop height recorder apparatus according to claim 10 further including an event summary memory and wherein the programmable controller means further includes a means for producing time and date information, and the programmable controller is connected to the data processing memory means and programmed to produce a summary of each event including peak acceleration signals and the time and date of each event for storage in the event summary memory.

18. A drop height recorder apparatus according to claim 17 wherein the programmable controller means includes means for determining from the recorded peak data the lowest peak data summary block for replacement by a newer peak data summary block exceeding in value that of the lowest peak data summary block determined.

19. A drop height recorder apparatus according to claim 17 wherein the programmable controller means further includes means for replacing in the event storage means the waveform data associated with the lowest peak data summary block with the newer waveform data associated with the replacing peak data summary block.

* * * * *